United States Patent
Niass et al.

(10) Patent No.: US 9,909,756 B2
(45) Date of Patent: Mar. 6, 2018

(54) STAGED CHEMICAL LOOPING PROCESS WITH INTEGRATED OXYGEN GENERATION

(71) Applicant: Saudi Arabian Oil Company, Dhahran (SA)

(72) Inventors: Tidjani Niass, Dhahran (SA); Mourad V. Younes, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1079 days.

(21) Appl. No.: 14/088,166

(22) Filed: Nov. 22, 2013

(65) Prior Publication Data
US 2014/0154634 A1 Jun. 5, 2014

Related U.S. Application Data

(60) Provisional application No. 61/732,069, filed on Nov. 30, 2012.

(51) Int. Cl.
*F23C 10/01* (2006.01)
*F23L 7/00* (2006.01)
(Continued)

(52) U.S. Cl.
CPC .......... *F23C 10/01* (2013.01); *C01B 13/0248* (2013.01); *C01B 13/0251* (2013.01);
(Continued)

(58) Field of Classification Search
CPC ........ F23C 10/01; F23C 10/005; F23C 10/08; F23C 10/10; F23C 2900/99008; F23C 10/00; B01J 8/26
See application file for complete search history.

(56) References Cited

U.S. PATENT DOCUMENTS 8,486,361 B2    7/2013    Bialkowski
2009/0020405 A1  1/2009    Fan
(Continued)

FOREIGN PATENT DOCUMENTS

CN    1271827 A    11/2000
CN    101550846 A    10/2009
(Continued)

OTHER PUBLICATIONS

Machine Translation of JP2001272003 (A) Oct. 5, 2001 (6 pages).
(Continued)

*Primary Examiner* — Jorge Pereiro
(74) *Attorney, Agent, or Firm* — Bracewell LLP; Constance G. Rhebergen; Kevin R. Tamm

(57) ABSTRACT

Disclosed is a method for enhanced fuel combustion to maximize the capture of by-product carbon dioxide. According to various embodiments of the invention, a method for combusting fuel in a two-stage process is provided, which includes in-situ oxygen generation. In-situ oxygen generation allows for the operation of a second oxidation stage to further combust fuel, thus maximizing fuel conversion efficiency. The integrated oxygen generation also provides an increased secondary reactor temperature, thereby improving the overall thermal efficiency of the process. The means of in-situ oxygen is not restricted to one particular embodiment, and can occur using an oxygen generation reactor, an ion transport membrane, or both. A system configured to the second stage combustion method is also disclosed.

19 Claims, 4 Drawing Sheets

Staged chemical looping combustion process with integrated oxygen generation.

(51) Int. Cl.
*C01B 13/02* (2006.01)
*F23C 99/00* (2006.01)

(52) U.S. Cl.
CPC .............. *F23C 99/00* (2013.01); *F23L 7/007* (2013.01); *F23C 2900/99008* (2013.01); *Y02E 20/344* (2013.01); *Y02E 20/346* (2013.01)

(56) References Cited

U.S. PATENT DOCUMENTS

| | | |
|---|---|---|
| 2010/0092898 A1 | 4/2010 | Dahl et al. |
| 2010/0299997 A1 | 12/2010 | Hoteit et al. |
| 2011/0117004 A1 | 5/2011 | Lamont et al. |
| 2011/0120560 A1 | 5/2011 | Proll et al. |
| 2011/0132737 A1 | 6/2011 | Jadhav |
| 2011/0171588 A1 | 7/2011 | Gauthier et al. |
| 2011/0198861 A1 | 8/2011 | Jallais et al. |
| 2011/0266196 A1 | 11/2011 | Gauthier et al. |
| 2011/0300060 A1 | 12/2011 | Guillou et al. |
| 2011/0303875 A1 | 12/2011 | Hoteit et al. |
| 2012/0100055 A1 | 4/2012 | Weber |
| 2012/0148484 A1 | 6/2012 | Gauthier et al. |
| 2012/0214106 A1 | 8/2012 | Song et al. |

FOREIGN PATENT DOCUMENTS

| | | |
|---|---|---|
| CN | 100387397 B | 9/2010 |
| CN | 102087023 A | 6/2011 |
| CN | 102183152 A | 9/2011 |
| CN | 102198934 A | 9/2011 |
| EP | 2 246 293 A1 | 11/2010 |
| EP | 2450420 A1 | 5/2012 |
| EP | 2 484 971 A1 | 8/2012 |
| FR | 2 960 943 A1 | 12/2011 |
| JP | 2001272003 A | 10/2001 |
| KR | 1035663 B1 | 5/2011 |
| WO | 2009138588 A1 | 11/2009 |
| WO | 2011007055 A2 | 1/2011 |
| WO | 2011052825 A1 | 5/2011 |
| WO | 2011/066376 A2 | 6/2011 |
| WO | 2012016582 A1 | 2/2012 |

OTHER PUBLICATIONS

Machine Translation of CN1271827 (A) Nov. 1, 2001 (4 pages).
Machine Translation of CN102198934 (A) Sep. 28, 2011 (9 pages).
PCT International Search Report and the Written Opinion of the International Searching Authority dated Feb. 26, 2014; International Application No. PCT/US2013/071441; International File Date: Nov. 22, 2013.
Adanez et al. "Progress in Chemical-Looping Combustion and Reforming technologies" Progress in Energy and Combustion Science 38, 2012, pp. 215-282.
Abad et al. "Demonstration of chemical-looping with oxygen uncoupling (CLOU) process in a 1.5 kWth continuously operating unit using a Cu-Based oxygen-carrier" International Journal of Greenhouse Gas Control, 6, 2012, pp. 189-200.
Mattisson et al. "The use of NiO as an oxygen carrier in chemical-looping combustion" Fuel 85, 2006, pp. 736-747.
Mattison et al., "The use of iron oxide as an oxygen carrier in chemical-looping combustion of methane with inherent separation of CO2" Fuel 80, 2001, pp. 1953-1962.
Adanez et al., "Selection of Oxygen Carriers for Chemical-Looping" Energy & Fuels, vol. 18, No. 2, 2004, pp. 371-377.

Staged chemical looping combustion process with integrated oxygen generation.

Staged chemical looping combustion process with integrated oxygen generation using an ion transport membrane.

Staged chemical looping combustion process with integrated oxygen generation using an oxygen generation reactor.

Equilibrium partial pressure of gaseous $O_2$ over different metal oxide systems

STAGED CHEMICAL LOOPING PROCESS WITH INTEGRATED OXYGEN GENERATION

RELATED APPLICATION

This application is related to, and claims priority to, U.S. Provisional Patent Application Ser. No. 61/732,069, filed on Nov. 30, 2012, the disclosure of which is incorporated herein by reference in its entirety.

BACKGROUND

Field of the Invention

Embodiments of the invention generally relate to a fuel combustion process and system. More specifically, embodiments of the invention relate to a two-stage combustion method and system which uses in-situ oxygen generation to combust a fuel and produce a carbon dioxide ($CO_2$) rich flue gas stream from which $CO_2$ can be captured for later utilization and/or sequestration.

Description of the Related Art

Greenhouse gas concentration in the atmosphere has increased significantly over the past years as a result of increasing $CO_2$ emissions. Several mitigation techniques, including, for example, $CO_2$ capture and sequestration (CCS), are being investigated to reduce $CO_2$ emissions in the atmosphere.

One way of reducing $CO_2$ emissions is to capture the $CO_2$ from exhaust flue gases. Several conventional techniques are being developed to capture $CO_2$ before or after combustion. When the combustion of the fuel occurs with atmospheric air, the presence of nitrogen in the air dilutes the $CO_2$ concentration in the flue gases, penalizing the separation of the $CO_2$ from the flue gases.

Several additional conventional techniques are being evaluated to capture $CO_2$ from industrial exhaust flue gases to overcome the limitations of conventional gas separation processes. These conventional techniques, however, are often cost prohibitive to operate. Flue gases produced from conventional combustion are therefore typically treated to capture the $CO_2$. The low concentration level of $CO_2$ in the flue gases results from the use of air (i.e., containing nitrogen) as the source of oxygen to drive the combustion reaction.

Another such conventional technique is chemical looping combustion (CLC), in which oxygen is transferred to fuel without nitrogen interference, thereby generating a $CO_2$ and water vapor stream after the fuel is oxidized. The water vapor can then be easily removed (i.e., through condensation), leaving a higher purity $CO_2$ stream ready for compression, transportation, and/or processing. For at least these reasons, CLC is extensively investigated as a viable means for reducing $CO_2$ emissions. Chemical looping is based on an oxygen carrier that can be oxidized in the presence of air and reduced in the presence of fuel, thereby transferring the oxygen from the air to the fuel. The oxygen carrier is oxidized in an air reactor where it reacts with oxygen present in the air to form metal oxide or oxygen carrier oxide. The oxidized oxygen carrier is fed subsequently to a fuel reactor in a reducing atmosphere where the oxidized oxygen carrier transfers its oxygen to the fuel, thereby allowing the reduced oxygen carrier to be used for another phase of oxidation with air. The fuel is oxidized in the fuel reactor to form combustion products among CO, $CO_2$, and $H_2O$, based on the level of fuel oxidation and whether the chemical looping process is for combustion or reforming.

Several oxygen carriers have been investigated for CLC. It has been found that some oxygen carriers have the characteristic of releasing gaseous oxygen in a fuel reactor, thereby enhancing the oxidation or combustion of fuels. Several oxygen carriers are being investigated for chemical looping processes and no oxygen carrier has been found to address all the challenges faced by conventional oxygen carriers (e.g., oxygen transport capacity, high reactivity, resistance to attrition, cost, lifetime, etc.). It is difficult to achieve full conversion of the fuel in many cases and oxygen polishing have been considered for completeness of the combustion. In such cases, the required oxygen is provided by an external source."

In-situ oxygen generation, for example, allows the operation of a second oxidation step in which all the fuel can be completely oxidized, maximizing fuel conversion efficiency. Furthermore, by increasing the flue gas temperature generated after oxygen combustion or oxidation, higher live steam temperatures, in the case of power generation, can be generated, thereby increasing the overall thermal efficiency of the process.

SUMMARY

Generally, embodiments of the invention are directed to methods of two-stage fuel combustion with integrated oxygen generation. Various embodiments provide chemical looping combustion processes where oxygen is transferred from air to fuel to partially or completely oxidize the fuel. As will be discussed in more detail below, in-situ oxygen generation, according to various embodiments, provides a second oxidation stage to further combust the fuel, resulting in a $CO_2$ rich flue gas stream from which $CO_2$ can be captured for later utilization and/or sequestration. The staged chemical looping combustion process, according to various embodiments of the invention, reduces the need to post-treat the $CO_2$ after the combustion process, resulting in cost savings.

Various embodiments demonstrate that independent of the bed configurations of an air reactor or a fuel reactor used in a conventional combustion process, it is possible to incorporate an oxygen carrier having the property of releasing gaseous oxygen under specific conditions called a Chemical Looping Oxygen Coupling (CLOU) effect, thereby enhancing fuel oxidation. In particular, the staged chemical looping combustion process, according to embodiments of the invention, uses an oxygen carrier with the CLOU effect to oxidize the fuel in a fuel reactor in a first stage, followed by the completion of the oxidation of the fuel in a second stage using pure oxygen generated by the oxygen released from the oxygen carrier with the CLOU effect.

According to at least one embodiment, a separator, for example, a solid/gas separator, is positioned downstream of an air reactor, for example, a circulating fluidized bed air reactor, to separate the oxidized oxygen carrier from oxygen-lean air. Hot oxygen-lean air is processed to generate energy, heat, and/or power, while the oxidized oxygen carrier is split into two streams: (1) a first stream feeding the fuel reactor, and (2) a second stream feeding the oxygen generator. The oxygen generator, according to one embodiment, is a heated bed with controlled pressure that releases gaseous oxygen from the oxygen carrier under appropriate temperature and pressure conditions.

In accordance with another embodiment, the hot oxygen-lean air is fed to an ion transport membrane (ITM) to generate gaseous oxygen that is combined with the gaseous oxygen produced from the heated bed. In this embodiment, any oxygen carrier can be used, since the required in-situ gaseous oxygen is produced from the ITM.

The generated gaseous oxygen is then conveyed to the second oxidation stage, where the fuel is completely oxidized. The reduced oxygen carrier is conveyed back to the air reactor or to the fuel reactor based on the level of reduction, thereby completing the cycle.

Therefore, in accordance with one embodiment, there is provided a method of two-stage combustion integrating in situ oxygen generation. The method includes oxidizing, using an air reactor, a reduced oxygen carrier stream to form an oxidized oxygen carrier stream, and separating, in a primary separator, an oxygen carrier and oxygen-depleted air from the oxidized oxygen carrier stream. The method further includes producing, in an oxygen generation system, gaseous oxygen. Further, the method includes combusting, using a primary fuel reactor, fuel in the presence of the oxygen carrier and combusting, using a secondary fuel reactor, at least one of an additional fuel supply and an unburned fuel exiting the primary fuel reactor in the presence of the gaseous oxygen.

In accordance with another embodiment of the invention, there is provided a method of two-stage combustion integrating in situ oxygen generation, which includes generating the gaseous oxygen in an ITM of the oxygen generation system.

In accordance with another embodiment of the invention, there is provided a method of two-stage combustion integrating in situ oxygen generation, which includes generating the gaseous oxygen in an oxygen generation reactor (OGR) of the oxygen generation system.

In accordance with at least one embodiment, the step of oxidizing includes oxidizing the reduced oxygen carrier stream using one of a riser reactor and a fluidized bed reactor In accordance with at least one embodiment, the step of combusting includes combusting the fuel using the primary fuel reactor being one of a fluidized bed reactor and a moving bed reactor.

In accordance with at least one embodiment, the step of combusting the at least one of the additional fuel supply and the unburned fuel exiting the primary fuel reactor includes combusting such a fuel using an oxy-fuel boiler or any type of a combustion chamber.

In accordance with at least one embodiment, the step of producing includes generating the gaseous oxygen in an ion transport membrane of the oxygen generation system for one of internal use or as a utility.

In accordance with at least one embodiment, the step of generating the gaseous oxygen in the ion transport membrane includes separating oxygen from the oxygen-depleted air leaving the primary separator.

In accordance with at least one embodiment, the step of producing includes generating the gaseous oxygen in an oxygen generation reactor of the oxygen generation system for one of internal use or as a utility.

In accordance with at least one embodiment, the oxygen carrier leaving the primary separator enters at least one of the primary fuel reactor, the oxygen generation reactor, and the secondary fuel reactor.

In accordance with at least one embodiment, the step of producing includes generating the gaseous oxygen in the oxygen generation reactor by at least one of increasing pressure of the oxygen generation reactor, adjusting the oxygen generation reactor temperature, and injecting a sweep gas, in the presence of the oxygen carrier. The sweep gas is selected from the group consisting of carbon dioxide and steam.

In accordance with at least one embodiment, the method further includes the step of separating, in a secondary separator, the gaseous oxygen and the oxygen carrier.

In accordance with another embodiment, there is provided a system for two-stage combustion integrating in situ oxygen generation, which includes an air reactor to oxidize a reduced oxygen carrier stream to form an oxidized oxygen carrier stream, a primary separator to separate an oxygen carrier and oxygen-depleted air from the oxidized oxygen carrier stream, an oxygen generation system to produce gaseous oxygen, a primary fuel reactor to combust fuel in the presence of the oxygen carrier, and a secondary fuel reactor to combust at least one of an additional fuel supply and an unburned fuel exiting the primary fuel reactor in the presence of the gaseous oxygen.

In accordance with at least one embodiment, the air reactor includes one of a riser reactor and a fluidized bed reactor.

In accordance with at least one embodiment, the primary fuel reactor includes one of a fluidized bed reactor and a moving bed reactor.

In accordance with at least one embodiment, the secondary fuel reactor further includes an oxy-fuel boiler or any type of a combustion chamber.

In accordance with at least one embodiment, the oxygen generation system includes an ion transport membrane.

In accordance with at least one embodiment, the ion transport membrane produces the gaseous oxygen by separating oxygen from the oxygen-depleted air leaving the primary separator.

In accordance with at least one embodiment, the oxygen generation system includes an oxygen generation reactor.

In accordance with at least one embodiment, the oxygen carrier leaving the primary separator enters at least one of the primary fuel reactor, the oxygen generation reactor, and the secondary fuel reactor.

In accordance with at least one embodiment, the oxygen generation reactor produces the gaseous oxygen by at least one of increasing pressure of the oxygen generation reactor, adjusting the oxygen generation reactor temperature, and injecting one of a sweep gas, in the presence of the oxygen carrier. The sweep gas is selected from the group consisting of carbon dioxide and steam.

In accordance with at least one embodiment, the system further includes a secondary separator configured to separate the gaseous oxygen and the oxygen carrier.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

Generally, embodiments of the invention are directed to methods for enhanced fuel combustion to maximize the capture of by-product $CO_2$ using a two-stage process for combustion with in-situ oxygen generation. The process, according to various embodiments of the invention, uses a chemical looping combustion process, for industrial applications including power, syngas, steam and heat (in general), or hydrogen production.

Embodiments of the invention provide for the combustion of fossil fuels, particularly liquid fuels, in a carbon constrained future, because a product stream of $CO_2$ and water vapor, from which water vapor, can be easily condensed and stripped off of the stream, producing a pure $CO_2$ stream to manage.

Embodiments of the invention further provide for a system that burns several fuel qualities and ensure that a complete conversion or oxidation of the fuel, thereby increasing process efficiency. The process, according to various embodiments, can be used to burn all types of fuels from solids to gases passing by liquid fuels, particularly heavy liquid fuels.

Figure 1:
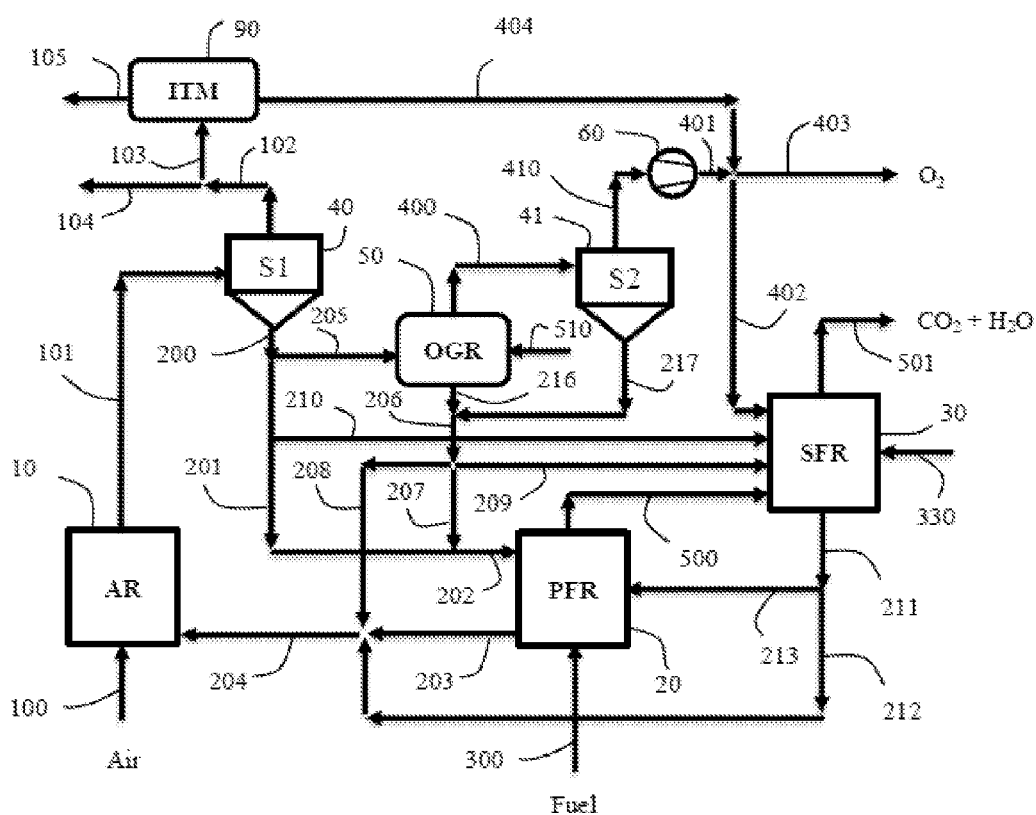
FIG. 1 is a flow diagram of a method showing a two-stage chemical looping combustion process integrating in-situ oxygen generation, in accordance with an embodiment of the invention.
Figure 2:
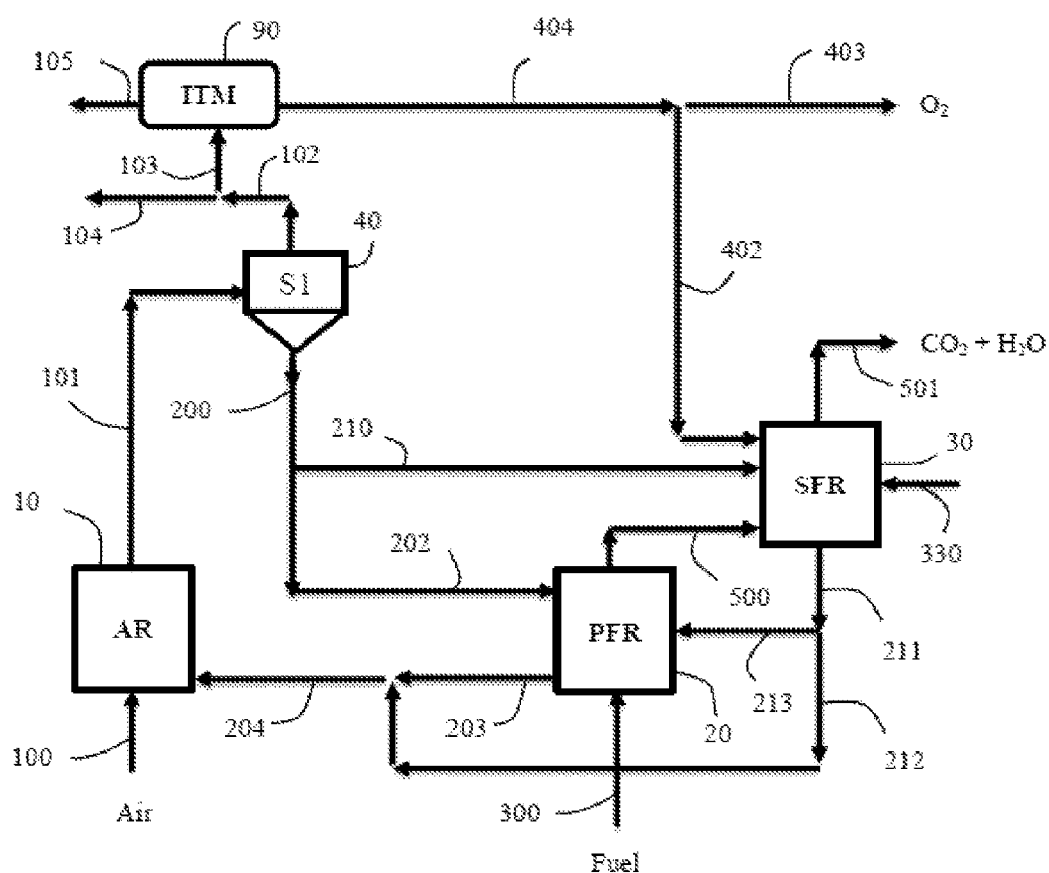
FIG. 2 is a flow diagram of a method showing a two-stage chemical looping combustion process with integrating in-situ oxygen generation using an ITM, in accordance with an embodiment of the invention.
Figure 3:
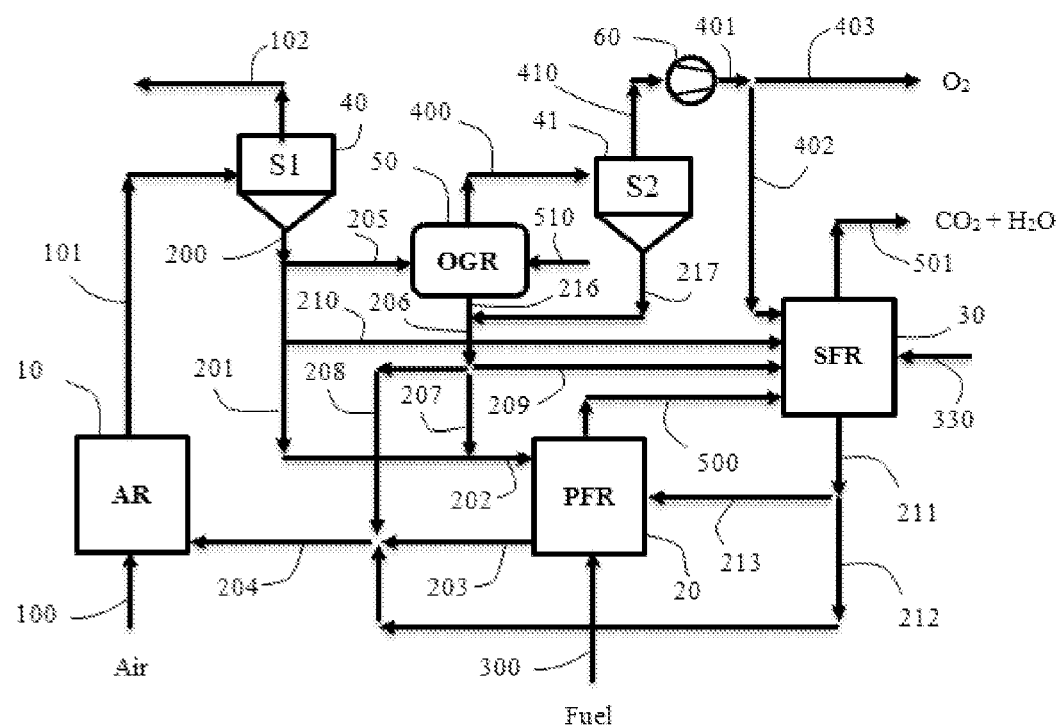
FIG. 3 is a flow diagram of a method showing a two-stage chemical looping combustion process with integrated oxygen generation using an OGR, in accordance with an embodiment of the invention.

As shown in FIGS. 1-3, various embodiments of the invention demonstrate that oxygen can be generated using an OGR, an ITM, or both. The chemical looping combustion process is based on integrated oxygen generation to complete fuel conversion, thereby increasing the efficiency of the process by increasing the fuel conversion efficiency and the temperature of the live steam.

As previously discussed, conventional chemical looping combustion processes use a single fuel reactor to oxidize or combust the fuel. Embodiments of the invention, on the other hand, provide fuel conversion using at least two stages, with a first stage including a fuel reactor (e.g., a fluidized bed or a moving bed fuel reactor), subsequently followed by a second stage including a combustion chamber or an oxy-fuel boiler using oxygen produced from the chemical looping combustion process that allows full conversion of the processed fuel, thereby producing a higher products stream temperature outlet that contributes to an increased process efficiency.

The two-stage chemical looping combustion process, according to various embodiments, includes fuel combustion reactors, oxygen generation by ITM and/or oxygen generation using an oxygen carrier having a CLOU effect, and an oxy-fuel combustion/oxidation process. Besides the staged oxidation/combustion reaction to achieve high fuel conversion, gaseous oxygen generation is provided by an in-situ oxygen generation process based on an ITM and/or a CLOU effect, providing an integrated and more efficient design.

Two-Stage Chemical Looping Combustion Process Integrating In-Situ Oxygen Generation FIG. 1 is a flow diagram of a method showing a two-stage chemical looping combustion process integrating in-situ oxygen generation, in accordance with an embodiment of the invention. As shown in FIG. 1, the two-stage chemical looping combustion process, according to at least one embodiment of the invention, utilizes air stream 100, which enters an air reactor (AR) 10 to oxidize incoming reduced oxygen carrier stream 204, which contains a reduced oxygen carrier. The resulting oxidized oxygen-carrier stream 101 is processed in a primary separator (S1) (e.g., a gas/solid separator) 40, where the oxygen-depleted air exits the primary separator 40 via stream 102 and an oxidized oxygen carrier exits the primary separator 40 via another stream 200 (e.g., oxidized oxygen-carrier stream 200). The oxygen-depleted air in stream 102 is conveyed for downstream processing, including, for example, power production and steam generation via another stream 104. The remaining portion of stream 102 is conveyed to an ion transport membrane (ITM) 90 for oxygen generation via another stream 103.

Ion Transport Membrane (ITM)

In accordance with various embodiments of the invention, the ITM 90, as shown in FIG. 1, separates the oxygen from the oxygen-depleted air. The produced gaseous oxygen is conveyed via stream 404 (e.g., oxygen stream 404) for internal usage or conveyed out of the system as a utility. The oxygen-depleted air leaves the ITM 90 through stream 105 for further processing, including, for example, power production and steam generation. In at least one embodiment, streams 104 and 105 are combined. In accordance with at least one embodiment, the ITM 90 operates at the temperature of the air reactor 10, which makes it easy to integrate the ITM 90 at the level of the oxygen-depleted air exiting the air reactor 10 (i.e., at stream 102 after the solid/gas separation in the primary separator 40, as shown in FIG. 1, or at stream 101 before the solid/gas separation in the primary separator 40), or inside the air reactor 10.

Oxygen Generation Reactor (OGR)

In accordance with various embodiments of the invention, oxidized oxygen-carrier stream 200 exiting the primary separator 40, as shown in FIG. 1, is split into stream 201 (e.g., oxidized oxygen-carrier stream 201) heading to a primary fuel reactor (PFR) 20, stream 205 (e.g., oxidized oxygen-carrier stream 205) heading to an oxygen generation reactor (OGR) 50, and stream 210 (e.g., oxidized oxygen-carrier stream 210) heading to a secondary fuel reactor (SFR) 30. In accordance with various embodiments, the flow ratios of streams 201, 205, and 210 can vary depending on the desired application of the chemical looping combustion process. Accordingly, in at least one embodiment, the flow of oxidized oxygen-carrier stream 210 is zero, depending on the system configuration, purpose, and the secondary fuel reactor 30 type.

The oxidized oxygen carrier in oxidized oxygen-carrier stream 201 enters the primary fuel reactor 20 via stream 202, where the oxidized oxygen carrier reacts with fuel introduced into the primary fuel reactor 20 via fuel feed stream 300. The fuel is oxidized in the primary fuel reactor 20, thereby reducing the oxidized oxygen carrier. The resulting oxygen-depleted stream containing the reduced oxygen carrier exits the primary fuel reactor 20 via stream 203 and is conveyed to the air reactor 10 via reduced oxygen carrier stream 204 for another cycle.

As further shown in FIG. 1, oxidized oxygen-carrier stream 205 enters the OGR 50 that is operated, for example, at a pressure and a temperature that enables the oxygen carrier to release gaseous oxygen in the OGR 50. In accordance with at least one embodiment, oxygen is recovered from the oxygen carrier by, for example, increasing a reactor pressure at a specific temperature or by injecting a sweep gas, such as $CO_2$ or steam.

For example, in accordance with one embodiment, depending on the system pressure, the gaseous oxygen is recovered via a vacuum pump or an extractor fan 60, as an example, that acts as a pressure increasing device to convey the oxygen out of the OGR 50. The rate of oxygen generation in the OGR 50 is adjusted by controlling the temperature and/or the pressure of the OGR 50 via the vacuum pump or the extractor fan 60. This embodiment is preferred if oxygen has to be produced as a utility and pure oxygen is required.

For example, in accordance with another embodiment, $CO_2$ and/or steam is injected into the OGR 50 via stream 510 to carry the gaseous oxygen from the OGR 50, via stream 400 (e.g., gaseous oxygen stream 400). The rate of oxygen generation in the OGR 50 is adjusted by controlling the flow rate of stream 510. This embodiment is preferred if the oxygen does not require a specific purity and the presence of a sweep gas is acceptable, and therefore a vector gas or sweep gas injection into the OGR 50 can be used to recover the oxygen.

If a sweep gas option is considered for the oxygen recovery from the OGR 50, it is possible to route a slip stream of products stream 501 (as will be discussed in more detail below) to the OGR 50 via stream 510 to generate the required oxygen that could be used in the secondary fuel reactor 30. Doing so can increase the recirculation rate, since part of products stream 501 is introduced indirectly into the secondary fuel reactor 30 via streams 510, 400, 410, 401, and 402. Combining the sweep gas oxygen recovery to the vacuum pump or extractor fan recovery technique allows for the control of the oxidation temperature in the secondary fuel reactor 30 by controlling the recirculation rate in the secondary fuel reactor 30, which gives increased flexibility to the system.

Gaseous oxygen stream 400 is processed in a secondary separator (S2) 41, where the separated oxygen exits the secondary separator 41 via stream 410 (e.g., gaseous oxygen stream 410), and the oxygen carrier exits the secondary separator 41 via stream 217. The gaseous oxygen stream 410 is conveyed to the secondary fuel reactor 30 via streams 401 (e.g., a oxygen stream 401) and 402. In accordance with an embodiment, the oxygen stream 401 meets oxygen stream 404 from the ITM 90 before it splits into stream 402 entering the secondary fuel reactor 30 and stream 403 exiting the chemical looping combustion process as a utility.

In accordance with at least one embodiment, stream 401 and oxygen stream 404 are diverted entirely to stream 402. In accordance with another embodiment, stream 401 and oxygen stream 404 are diverted entirely to stream 403 for delivering the oxygen as a utility. In this embodiment, the process can be run without second stage combustion or without supplied gaseous oxygen stage combustion. In accordance with yet another embodiment, stream 401 and oxygen stream 404 are distributed between streams 402 and 403 depending on the oxygen requirements for each flow. In accordance with a yet another embodiment, stream 403 and oxygen stream 404 are injected into the primary fuel reactor 20 to increase the oxidation rate in the OGR 50. In accordance with yet another embodiment, the oxygen in oxygen stream 404 is used as a utility, while the oxygen in stream 401 is used internally. This final embodiment is dependent on the purity and oxygen recovery method used for recovery of the oxygen from the oxygen carrier particles in the OGR 50, as will be discussed in more detail below.

The process according to various embodiments, as shown in FIG. 1, generates oxygen for use internally, externally, or both. This is possible, for example, by adjusting the flow ratio of oxidized oxygen-carrier stream 200 between the primary fuel reactor 20 and the OGR 50, and further by adjusting the flow of the produced gaseous oxygen in the ITM 90 by varying the flow ratio between streams 103 and 104.

Fuel Reactors

As noted above, the oxygen generation from the OGR 50 can be controlled by controlling the temperature and/or the pressure of the OGR 50 via vacuum pump or an extractor fan 60, in the case of an increased pressure oxygen generation scheme, or by controlling the flow rate of stream 510, in the case of a sweep gas oxygen recovery scheme.

In accordance with various embodiments, the reduced oxygen carrier in the OGR 50 exits the OGR 50 via stream 216. Stream 217 joins stream 216 to form stream 206. As shown in FIG. 1, stream 206 can be conveyed to the primary fuel reactor 20 via stream 207 and/or to the air reactor 10 via stream 208 and/or to the secondary fuel reactor 30 via stream 209. In a preferred embodiment, stream 206 is conveyed directly to the air reactor 10. In accordance with various embodiments, the flow rates of streams 207, 208, and 209 vary, for example, from 0% to 100% of the initial flow rate of stream 206 depending on the system configuration, application, and level of reduction of the oxygen carrier in stream 206.

For example, in accordance with one embodiment, the oxygen carrier of stream 206 is fully reduced. In this embodiment, the oxygen carrier in stream 206 is preferably conveyed via stream 208 to the air reactor 10, while joining stream 203 from the primary fuel reactor 20 to enter the air reactor 10 via reduced oxygen carrier stream 204. In another embodiment, the oxygen carrier of stream 206 is lightly reduced. In this embodiment, the oxygen carrier withstands more reduction in the primary fuel reactor 20 and/or the secondary fuel reactor 30. The oxygen carrier in stream 206 is then conveyed via stream 207 to meet oxidized oxygen-carrier stream 201 and enter the primary fuel reactor 20 via stream 202 and/or be conveyed via stream 209 to enter the secondary fuel reactor 30.

As further shown in FIG. 1, gaseous stream 500, in accordance with an embodiment, exits the primary fuel reactor 20 and is introduced to the secondary fuel reactor 30 to oxidize the remaining fuel and increase the efficiency of the process. Products stream 501 generally discussed above is sent for downstream processing, including, for example, energy recovery, steam generation, and utilities supply.

In accordance with at least one embodiment, the secondary fuel reactor 30 is, for example, an oxidizing reactor operated by, for example, gaseous oxygen with or without oxygen carriers and with or without fuel introduction depending on the scheme and purpose of the process. In a preferred embodiment of the process for power generation, the secondary fuel reactor 30 is a boiler operated by oxy-fuel combustion with the oxygen being delivered via stream 402 produced in-situ.

In accordance with certain embodiments, it is possible to use part or all of gaseous stream 500 exiting the primary fuel reactor 20 to control the temperature in the secondary fuel reactor 30. In accordance with certain embodiments of the invention, it is possible to recycle stream 501 exiting the secondary fuel reactor, 30, to control the temperature in the secondary fuel reactor, 30. The use of an oxy-boiler in the secondary fuel reactor 30 provides a higher flue gas temperature in the stream 501, leading to a higher live stream temperature in a power generation scheme, thereby increasing the efficiency of the chemical looping combustion process.

In some embodiments, the chemical looping combustion process is designed for combustion and $CO_2$ capture. In such embodiments, products stream 501 is composed mainly of $CO_2$ and steam. In such a case, it is possible to condense the steam and drain it from the products stream 501, leaving high purity $CO_2$ in products stream 501. The $CO_2$ can then be further processed depending on the $CO_2$ quality required.

In some embodiments, the secondary fuel reactor 30 is fed by oxygen carriers via stream 209 and/or stream 210. In such embodiments, the oxygen carrier is reduced in the secondary fuel reactor 30 and exits through stream 211. The oxygen carrier in the stream 211 is fed to the primary fuel reactor 20 via stream 213 and/or conveyed for oxidation in the air reactor 10 via streams 212 and reduced oxygen carrier stream 204. The secondary fuel reactor 30 includes a fuel stream 330.

The process according to various embodiments of the invention, as shown in FIG. 1, are operated at ambient pressure or near ambient pressure. The process can also be operated at high pressure. In certain embodiments, the air reactor 10 is operated at atmospheric pressure. In such embodiments, the air reactor 10 includes an extractor fan (not shown) at the stream 102 and/or at oxygen stream 404 to create a pressure difference and transport the produced gaseous oxygen via the oxygen stream 404.

Two-Stage Chemical Looping Combustion Process Integrating In-Situ Oxygen Generation Using ITM FIG. 2 is a flow diagram of a method showing a two-stage chemical looping combustion process integrating in-situ oxygen generation using an ITM, in accordance with an embodiment of the invention. FIG. 2 contains similar elements as discussed above for the two-stage chemical looping combustion process shown in FIG. 1, as represented with like numbers, and as discussed above. The two-stage chemical looping combustion process, as shown in FIG. 2, is distinguished from the two-stage chemical looping combustion process, as shown in FIG. 1, in that it eliminates the OGR 50 and all associated streams and processes to and from the OGR 50 discussed above for the two-stage chemical looping combustion process shown in FIG. 1. Furthermore, the two-stage chemical looping combustion process shown in FIG. 2 does not include the secondary separator 41 or the vacuum pump/extractor fan 60 discussed above for the two-stage chemical looping combustion process shown in FIG. 1.

Similarly for the two-stage chemical looping combustion process shown in FIG. 1, the ITM 90 separates the oxygen from the oxygen-depleted air. The produced gaseous oxygen is conveyed via oxygen stream 404 for internal usage (i.e., to feed the secondary fuel reactor 30 via stream 402) and/or conveyed out of the system as a utility via stream 403. The oxygen-depleted air leaves the ITM 90 through the stream 105 for further processing, including, for example, power production and steam generation. In at least one embodiment, streams 104 and 105 are combined.

As discussed above for the two-stage chemical looping combustion process shown in FIG. 1, the two-stage chemical looping combustion process shown in FIG. 2 uses an ITM that operates at the temperature of the air reactor 10, which makes it easy to integrate the ITM 90 at the level of the oxygen-depleted air exiting the air reactor 10 (i.e., at stream 102 after the solid/gas separation in the primary separator 40, as shown in FIG. 2, or at stream 101 before the solid/gas separation in the primary separator 40), or inside the air reactor 10.

As further shown in FIG. 2, oxidized oxygen carrier stream 200 exiting the primary separator 40 is split into stream 202 heading to the primary fuel reactor 20, and oxidized oxygen-carrier stream 210 heading to a secondary fuel reactor 30. Depending on the system configuration, purpose, and type of the secondary fuel reactor 30, the flow rate of oxidized oxygen-carrier stream 210 may be zero. In accordance with an embodiment, the ratio of the flow rates between streams 202 and the oxidized oxygen-carrier stream 210 vary depending on the application of the chemical looping combustion process and system transitions (e.g., cold start transitions).

The oxidized oxygen carrier in stream 200 enters the primary fuel reactor 20 via stream 202, where the oxidized oxygen carrier reacts with fuel introduced into the primary fuel reactor 20 via a fuel feed stream 300. The fuel is oxidized in the primary fuel reactor 20, thereby reducing the oxidized oxygen carrier. The resulting oxygen-depleted stream containing the reduced oxygen carrier exits the primary fuel reactor 20 via stream 203 and is conveyed to the air reactor 10 via reduced oxygen carrier stream 204.

In accordance with one embodiment, the entire oxygen stream 404 is diverted entirely to stream 402 to carry out the two-stage chemical looping combustion process. In accordance with another embodiment, oxygen stream 404 is diverted entirely to stream 403 for delivering oxygen as a utility. In this embodiment, the process can be run without second stage combustion or without supplied gaseous oxygen stage combustion. In accordance with yet another embodiment, oxygen stream 404 is distributed between streams 402 and 403 depending on the oxygen requirements for each flow. In accordance with a yet another embodiment, oxygen stream 404, in part or in whole, is injected into the primary fuel reactor 20 (not shown) to increase the oxidation rate in the primary fuel reactor 20.

The process according to various embodiments, as shown in FIG. 2, generates oxygen for use internally, externally, or both. This is possible, for example, by adjusting the flow of oxygen generated in the ITM 90 by varying the flow ratio between streams 103 and 104.

As similarly shown in FIG. 1, gaseous stream 500, as shown in FIG. 2, exits the primary fuel reactor 20 and is introduced to the secondary fuel reactor 30 to oxidize the remaining fuel and increase the efficiency of the process. Products stream 501 generally discussed above is sent for downstream processing, including, for example, energy recovery, steam generation, and utilities supply.

In accordance with at least one embodiment, the secondary fuel reactor 30 is, for example, an oxidizing reactor operated by, for example, gaseous oxygen with or without oxygen carriers and with or without fuel introduction depending on the scheme and purpose of the process. In a preferred embodiment of the process for power generation, the secondary fuel reactor 30 is a boiler operated by oxy-fuel combustion with the oxygen being delivered via stream 402 produced in-situ.

In accordance with an embodiment, it is possible to use part or all of gaseous stream 500 exiting the primary fuel reactor 20 to control the temperature in the secondary fuel reactor 30. In accordance with certain embodiments of the invention, it is possible to recycle stream 501 exiting the secondary fuel reactor, 30, to control the temperature in the secondary fuel reactor, 30. The use of an oxy-boiler in the secondary fuel reactor 30 provides a higher flue gas temperature in stream 501, leading to a higher live stream temperature in a power generation scheme, thereby increasing the efficiency of the chemical looping combustion system.

In some embodiments, the chemical looping combustion process, as shown in FIG. 2, is designed for combustion and $CO_2$ capture. In such embodiments, products stream 501 is composed mainly of $CO_2$ and steam. In such a case, it is possible to condense the steam and drain it from products stream 501, leaving high purity $CO_2$ in products stream 501. The $CO_2$ can then be further processed depending on the $CO_2$ quality required.

In some embodiments, the secondary fuel reactor 30 is fed by oxygen carriers via stream 210. In such embodiments, the oxygen carrier is reduced in the secondary fuel reactor 30 and exits through stream 211. The oxygen carrier in stream 211 is fed to the primary fuel reactor 20 via stream 213 and/or conveyed for oxidation in the air reactor 10 via streams 212 and reduced oxygen carrier stream 204. The secondary fuel reactor 30 includes fuel stream 330.

The process according to various embodiments of the invention, as shown in FIG. 2, is operated at ambient pressure or near ambient pressure. The process can also be operated at high pressure. In certain embodiments, the air reactor 10, the primary fuel reactor 20, and the secondary fuel reactor 30 are operated at the same pressure, while in other embodiments, they are operated at different pressures. In such embodiments, the air reactor 10 includes an extractor fan (not shown) at stream 102 and/or at oxygen stream 404 to create a pressure difference and transport the produced gaseous oxygen via oxygen stream 404.

Two-Stage Chemical Looping Combustion Process Integrating In-Situ Oxygen Generation Using OGR FIG. 3 is a flow diagram of a method showing a two-stage chemical looping combustion process integrating in-situ oxygen generation using an OGR, in accordance with an embodiment of the invention. FIG. 3 contains similar elements as discussed above for the two-stage chemical looping combustion process shown in FIG. 1, as represented with like numbers, and as discussed above. The two-stage chemical looping combustion process, as shown in FIG. 3, is distinguished from the two-stage chemical looping combustion process, as shown in FIG. 1, in that it eliminates the ITM 90 and all associated streams and processes to and from the ITM 90 discussed above for the two-stage chemical looping combustion process shown in FIG. 1.

Similar to the two-stage chemical looping combustion process shown in FIG. 1, the two-stage chemical looping combustion process, as shown in FIG. 3, utilizes air stream 100, which enters the air reactor 10 to oxidize incoming reduced oxygen carrier stream 204, which contains a reduced oxygen carrier. The resulting oxidized oxygen-carrier stream 101 is processed in a primary separator 40, where the oxygen-depleted air exits the primary separator 40 via stream 102 and the oxidized oxygen carrier exits the primary separator 40 via oxidized oxygen-carrier stream 200. The oxygen-depleted air in stream 102 is conveyed for downstream processing, including, for example, power production and steam generation.

In accordance with some embodiments, oxidized oxygen-carrier stream 200 exiting the primary separator 40, as shown in FIG. 3, is split into oxidized oxygen-carrier stream 201 heading to a primary fuel reactor 20, oxidized oxygen-carrier stream 205 heading to the OGR 50, and oxidized oxygen-carrier stream 210 heading to a secondary fuel reactor 30. In accordance with various embodiments, the flow ratios of streams 201, 205, and 210 can vary depending on the desired application of the chemical looping combustion process. Accordingly, in at least one embodiment, the flow of oxidized oxygen-carrier stream 210 is zero, depending on the system configuration, purpose, and the secondary fuel reactor type.

The oxidized oxygen carrier in the oxidized oxygen-carrier stream 201 enters the primary fuel reactor 20 via a stream 202, where the oxidized oxygen carrier reacts with fuel introduced into the primary fuel reactor 20 via a fuel feed stream 300. The fuel is oxidized in the primary fuel reactor 20, thereby reducing the oxidized oxygen carrier. The resulting reduced oxygen carrier stream containing the reduced oxygen carrier exits the primary fuel reactor 20 via stream 203 and is conveyed to the air reactor 10 via reduced oxygen carrier stream 204.

As further shown in FIG. 3, oxidized oxygen-carrier stream 205 enters the OGR 50 that is operated, for example, at a pressure and a temperature that enables the oxygen carrier to release gaseous oxygen in the OGR 50. In accordance with at least one embodiment, oxygen is recovered from the oxygen carrier by, for example, increasing a reactor pressure at a specific temperature, adjusting the OGR 50 temperature for a given pressure, or by injecting a sweep gas, such as $CO_2$ or steam.

For example, in accordance with one embodiment, gaseous oxygen is recovered via a vacuum pump or an extractor fan 60 that acts as a pressure increasing device to convey the oxygen out of the OGR 50. The rate of oxygen generation in the OGR 50 is adjusted by controlling the temperature and/or the pressure of the OGR 50 via the vacuum pump or the extractor fan 60. This embodiment is preferred if oxygen has to be produced as a utility and pure oxygen is required.

For example, in accordance with another embodiment, $CO_2$ and/or steam is injected into the OGR 50 via stream 510 to carry the gaseous oxygen from the OGR 50, via gaseous oxygen stream 400. The rate of oxygen generation in the OGR 50 is adjusted by controlling the flow rate of stream 510. This embodiment is preferred if the oxygen does not require a specific purity and the presence of a sweep gas is acceptable, and therefore a vector gas or sweep gas injection into the OGR 50 can be used to recover the oxygen.

If a sweep gas option is considered for the oxygen recovery from the OGR 50, it is possible to route a slip stream of the products stream 501, as discussed above for FIG. 1, to the OGR 50 via stream 510 to generate the required oxygen that will be used in the secondary fuel reactor 30. Doing so can increase the recirculation rate, since part of products stream 501 is introduced indirectly into the secondary fuel reactor 30 via streams 510, 400, 410, 401, and 402. Combining the sweep gas oxygen recovery to the vacuum pump or extractor fan recovery technique allows for the control of the oxidation temperature in the secondary fuel reactor 30 by controlling the recirculation rate in the secondary fuel reactor 30, which gives increased flexibility to the system.

Gaseous oxygen stream 400 is processed in the secondary separator 41, where the separated oxygen exits the secondary separator 41 via gaseous oxygen stream 410, and the oxygen carrier exits the secondary separator 41 via stream 217. Gaseous oxygen stream 410 is conveyed to the secondary fuel reactor 30 via oxygen stream 401 and stream 402. In accordance with an embodiment, oxygen stream 401 splits into stream 402 entering the secondary fuel reactor 30 and stream 403 exiting the chemical looping combustion process as a utility.

In accordance with one embodiment, the oxygen stream 401 is diverted entirely to the stream 402 to carry out the two-stage chemical looping combustion process. In accordance with another embodiment, the oxygen stream 401 is diverted entirely to the stream 403 for delivering the oxygen as a utility. In this embodiment, the process can be run without second stage combustion or without supplied gaseous oxygen stage combustion. In accordance with a yet another embodiment, the stream 403, in part or in whole, is injected into the primary fuel reactor 20 to increase the oxidation rate in the primary fuel reactor 20 (not shown).

The process according to various embodiments, as shown in FIG. 3, generates oxygen for use internally, externally, or both. This is possible, for example, by adjusting the flow ratio of oxidized oxygen-carrier stream 200 between the primary fuel reactor 20 and the OGR 50.

As noted above, the oxygen generation from the OGR 50 can be controlled by controlling the temperature and/or the pressure of the OGR 50 via vacuum pump or an extractor fan 60, in the case of a reduced pressure oxygen generation scheme, adjusting the OGR 50 temperature for a given pressure, or by controlling the flow rate of stream 510, in the case of a sweep gas oxygen recovery scheme.

In accordance with various embodiments, the reduced oxygen carrier in the OGR 50 exits the OGR 50 via stream 216. Stream 217 joins stream 216 to form stream 206. As shown in FIG. 3, stream 206 can be conveyed to the primary fuel reactor 20 via stream 207 and/or to the air reactor 10 via stream 208 and/or to the secondary fuel reactor 30 via stream 209. In a preferred embodiment, stream 206 is conveyed directly to the air reactor 10. In accordance with various embodiments, the flow rates of the streams 207, 208, and 209 vary, for example, from 0% to 100% of the initial flow rate of stream 206 depending on the system configuration, application, and level of reduction of the oxygen carrier in stream 206.

Similarly for the two-stage chemical looping combustion process shown in FIG. 1, the oxygen carrier of the stream 206, according to the two-stage chemical looping combustion process shown in FIG. 3, can be fully reduced. In this embodiment, the oxygen carrier in stream 206 is preferably conveyed via stream 208 to the air reactor 10, while joining stream 203 from the primary fuel reactor 20 to enter the air reactor 10 via reduced oxygen carrier stream 204. In another embodiment, if the oxygen carrier of stream 206 is lightly reduced, the oxygen carrier withstands more reduction in the primary fuel reactor 20 and/or the secondary fuel reactor 30. The oxygen carrier in stream 206 is then conveyed via stream 207 to meet the oxidized oxygen-carrier stream 201 and enters the primary fuel reactor 20 via stream 202 and/or be conveyed via stream 209 to enter the secondary fuel reactor 30.

As further shown in FIG. 3, gaseous stream 500, in accordance with an embodiment, exits the primary fuel reactor 20 and is introduced to the secondary fuel reactor 30 to oxidize the remaining fuel and increase the efficiency of the process. Products stream 501 generally discussed above is sent for downstream processing, including, for example, energy recovery, steam generation, and utilities supply.

In accordance with at least one embodiment, the secondary fuel reactor 30 is, for example, an oxidizing reactor operated by, for example, gaseous oxygen with or without oxygen carriers and with or without fuel introduction depending on the scheme and purpose of the process. In a preferred embodiment of the process for power generation, the secondary fuel reactor 30 is a boiler operated by oxy-fuel combustion with the oxygen being delivered via stream 402 produced in-situ.

In accordance with certain embodiments, it is possible to use gaseous stream 500 exiting the primary fuel reactor 20 to control the temperature in the secondary fuel reactor 30. In accordance with certain embodiments of the invention, it is possible to recycle stream 501 exiting the secondary fuel reactor, 30, to control the temperature in the secondary fuel reactor, 30. The use of an oxy-boiler in the secondary fuel reactor 30 provides a higher flue gas temperature in the stream 501, leading to a higher live stream temperature in a power generation scheme, thereby increasing the efficiency of the chemical looping combustion process.

Similar to the embodiments discussed above for FIGS. 1 and 2, the chemical looping combustion process, as shown in FIG. 3, is designed for combustion and $CO_2$ capture. In such embodiments, products stream 501 is composed mainly of $CO_2$ and steam. In such a case, it is possible to condense the steam and drain it from products stream 501, leaving high purity $CO_2$ in products stream 501. The $CO_2$ can then be further processed depending on the $CO_2$ quality required.

Furthermore, in some embodiments, the secondary fuel reactor 30, as shown in FIG. 3, is fed by oxygen carriers via stream 209 and/or stream 210. In such embodiments, the oxygen carrier is reduced in the secondary fuel reactor 30 and exits through stream 211. The oxygen carrier in stream 211 is fed to the primary fuel reactor 20 via stream 213 and/or conveyed for oxidation in the air reactor 10 via streams 212 and reduced oxygen carrier stream 204. The secondary fuel reactor 30 includes a fuel stream 330.

Similar to the embodiments discussed above for FIG. 2, the process according to various embodiments of the invention, as shown in FIG. 3, is operated at ambient pressure or near ambient pressure. The process can also be operated at high pressure. In certain embodiments, the air reactor 10, the primary fuel reactor 20, and the secondary fuel reactor 30 are operated at the same pressure, while in other embodiments, they are operated at different pressures.

Figure 4:
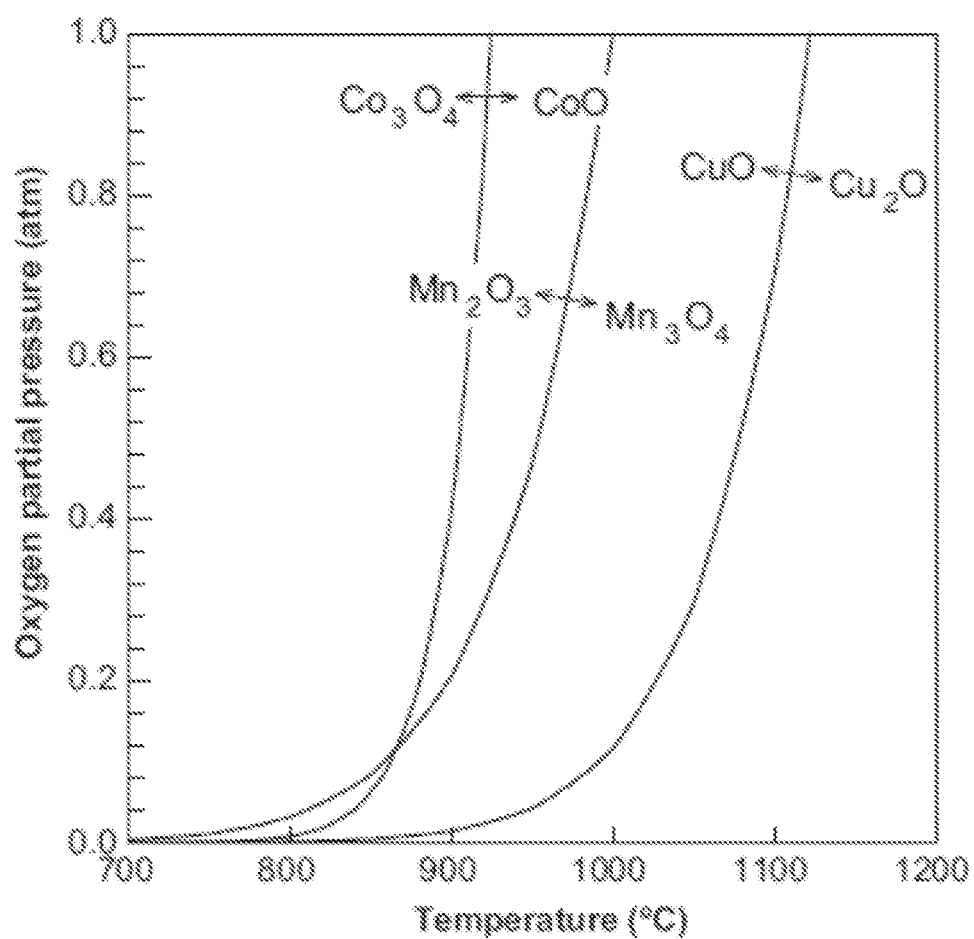
FIG. 4 is a graph showing the equilibrium partial pressures of gas-phase $O_2$ over different metal oxide systems, in accordance with an embodiment of the invention.

FIG. 4 is a graph showing the equilibrium partial pressures of gas-phase $O_2$ over different metal oxide systems. FIG. 4 further shows the CLOU effect of some oxygen carriers in contributing to complete fuel combustion or oxidation by gaseous $O_2$ to maximize system efficiency.

In accordance with various embodiments, the air reactor 10, the primary fuel reactor 20, and the secondary fuel reactor 30 is a type selected from a group consisting of a fluidized bed, a fast riser, a bubbling bed, a moving bed, a fixed bed, and a rotating bed. According to various embodiments, the secondary fuel reactor 30 further includes a combustion chamber or a boiler. One of ordinary skill in the relevant art would have understood that each reactor type has particular advantages and drawbacks, whereby the selection of the specific reactor type for each of the air reactor 10, the primary fuel reactor 20, and the secondary fuel reactor 30 is based on various factors discussed above for the various embodiments of the invention.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A system for two-stage combustion integrating in situ oxygen generation, the system comprising:
    an air reactor configured to oxidize a reduced oxygen carrier stream to form an oxidized oxygen carrier stream comprising an oxygen carrier;
    a primary separator configured to separate the oxygen carrier and oxygen-depleted air from the oxidized oxygen carrier stream;
    an oxygen generation system comprising an oxygen generation reactor configured to produce gaseous oxygen;
    a primary fuel reactor configured to combust fuel in the presence of the oxygen carrier; and
    a secondary fuel reactor configured to combust at least one of an additional fuel supply and an unburned fuel exiting the primary fuel reactor in the presence of the gaseous oxygen produced in the oxygen generation system, wherein the secondary fuel reactor has conveyed to the secondary fuel reactor the oxygen carrier from the air reactor.

2. The system of claim 1, wherein the air reactor comprises one of a riser reactor and a fluidized bed reactor.

3. The system of claim 1, wherein the primary fuel reactor comprises one of a fluidized bed reactor and a moving bed reactor.

4. The system of claim 1, wherein the secondary fuel reactor further comprises an oxy-fuel boiler or any type of a combustion chamber.

5. The system of claim 1, wherein the oxygen generation system comprises an ion transport membrane.

6. The system of claim 5, wherein the ion transport membrane is configured to produce the gaseous oxygen by separating oxygen from the oxygen-depleted air leaving the primary separator.

7. The system of claim 1, wherein the oxygen carrier leaving the primary separator enters at least one of the primary fuel reactor, the oxygen generation reactor, and the secondary fuel reactor.

8. The system of claim 1, wherein the oxygen generation reactor is configured to produce the gaseous oxygen by at least one of increasing pressure of the oxygen generation reactor, adjusting the oxygen generation reactor temperature, and injecting one of a sweep gas, the sweep gas selected from the group consisting of carbon dioxide and steam, in the presence of the oxygen carrier.

9. The system of claim 1, further comprising:
    a secondary separator configured to separate the gaseous oxygen and the oxygen carrier.

10. A method of two-stage combustion integrating in situ oxygen generation, the method comprising:
    oxidizing, using an air reactor, a reduced oxygen carrier stream to form an oxidized oxygen carrier stream comprising an oxygen carrier;
    separating, in a primary separator, the oxygen carrier and oxygen-depleted air from the oxidized oxygen carrier stream;
    producing, in an oxygen generation system comprising an oxygen generation reactor, gaseous oxygen;
    combusting, using a primary fuel reactor, fuel in the presence of the oxygen carrier; and
    combusting, using a secondary fuel reactor, at least one of an additional fuel supply and an unburned fuel exiting the primary fuel reactor in the presence of the gaseous oxygen produced in the oxygen generation system, wherein the secondary fuel reactor has conveyed to the secondary fuel reactor the oxygen carrier from the air reactor.

11. The method of claim 10, wherein the oxidizing comprises oxidizing the reduced oxygen carrier stream using one of a riser reactor and a fluidized bed reactor.

12. The method of claim 10, wherein the combusting comprises combusting the fuel using the primary fuel reactor being one of a fluidized bed reactor and a moving bed reactor.

13. The method of claim 10, wherein the combusting the at least one of the additional fuel supply and the unburned fuel exiting the primary fuel reactor comprises combusting such a fuel using an oxy-fuel boiler or any type of a combustion chamber.

14. The method of claim 10, wherein the producing comprises generating the gaseous oxygen in an ion transport membrane of the oxygen generation system for one of internal use or as a utility.

15. The method of claim 14, wherein the generating the gaseous oxygen in the ion transport membrane comprises separating oxygen from the oxygen-depleted air leaving the primary separator.

16. The method of claim 10, wherein the producing comprises generating the gaseous oxygen in the oxygen generation system for one of internal use or as a utility.

17. The method of claim 16, wherein the oxygen carrier leaving the primary separator enters at least one of the primary fuel reactor, the oxygen generation reactor, and the secondary fuel reactor.

18. The method of claim 16, wherein the producing comprises generating the gaseous oxygen in the oxygen generation reactor by at least one of increasing pressure of the oxygen generation reactor, adjusting the oxygen generation reactor temperature, and injecting a sweep gas, the sweep gas selected from the group consisting of carbon dioxide and steam, in the presence of the oxygen carrier.

19. The method of claim 18, further comprising:
    separating, in a secondary separator, the gaseous oxygen and the oxygen carrier.

* * * * *